Oct. 27, 1925.

C. B. HOUSE 1,559,101

CUSHION SPRING SHACKLE

Filed Jan. 31, 1923

Inventor
C. B. House

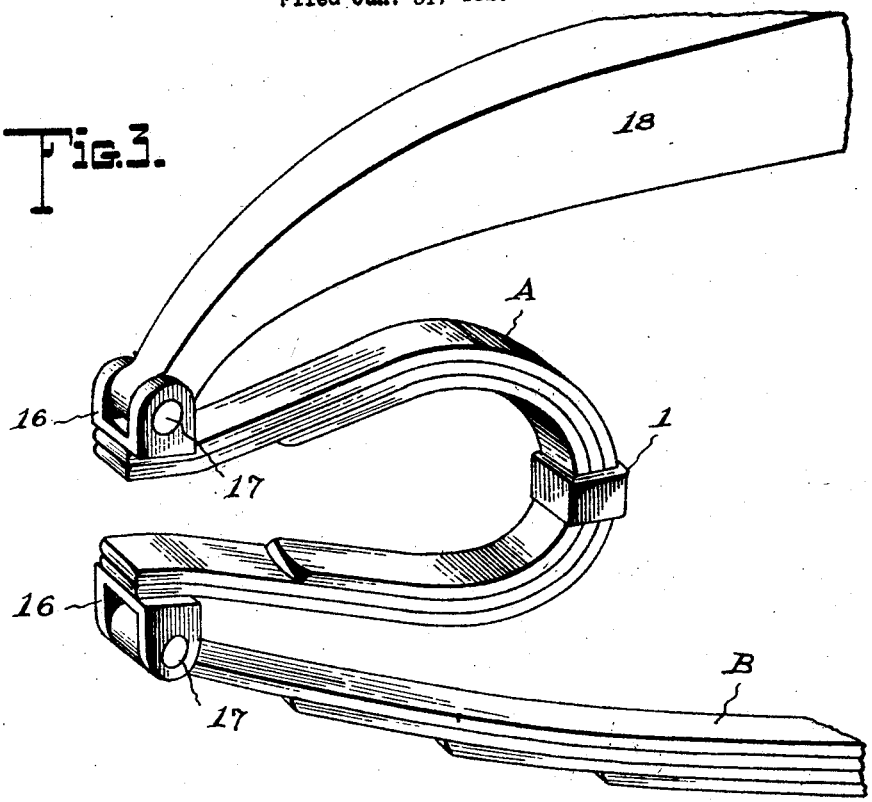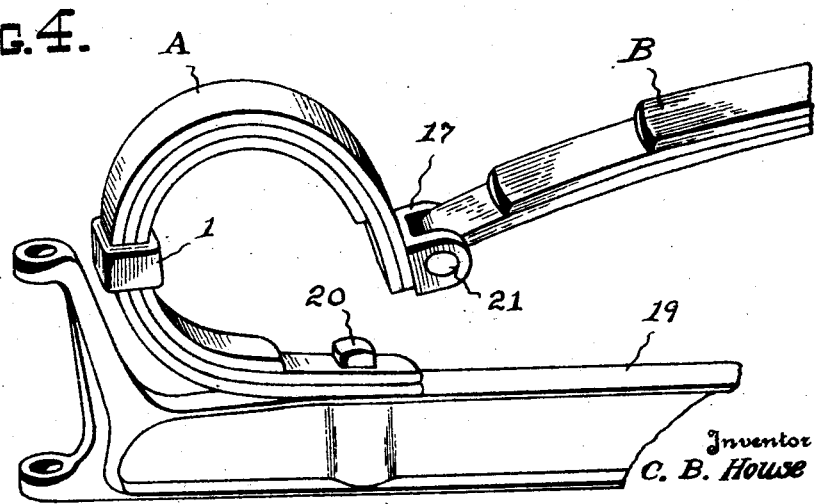

Patented Oct. 27, 1925.

1,559,101

UNITED STATES PATENT OFFICE.

CHARLES B. HOUSE, OF KLAMATH FALLS, OREGON.

CUSHION-SPRING SHACKLE.

Application filed January 31, 1923. Serial No. 615,994.

*To all whom it may concern:*

Be it known that I, CHARLES B. HOUSE, a citizen of the United States, residing at Klamath Falls, in the county of Klamath and State of Oregon, have invented certain new and useful Improvements in Cushion-Spring Shackles, of which the following is a specification.

The present invention relates to a cushion spring shackle and has for its object to provide a device of this character which embodies novel features of construction, whereby increased resiliency and smoother riding qualities may be imparted to the spring body suspending means of a vehicle.

Further objects of the invention are to provide a device of this character which is adapted to be so constructed as to be applied as an attachment to the different types of vehicle springs which are commonly in use at the present time. The use of the attachment results in more effective spring action, with the result that all sudden shocks and jars are more completely absorbed, thereby allowing the wheels to roll over rough roads and obstructions with a minimum shaking up of the car body.

With the above and other objects in view the invention consists in certain combinations and arrangements of the parts as will more fully appear as the description proceeds, the novel features thereof being pointed out in the appended claims.

Several possible embodiments of the invention are illustrated by the accompanying drawings, although it will be understood that many modifications and changes can be made in the details of constructions and I do not restrict myself to the exact constructions which have been shown on the drawings for illustrative purposes.

In the accompanying drawings, Figure 1 is a perspective view of a cushion spring shackle which is constructed in accordance with the invention, showing the same as applied to the rear spring of a truck.

Figures 3 and 4 are similar views showing further modifications of the invention.

Corresponding and like parts are referred to in the following description and indicated on all of the views of the drawings by like reference characters.

In all of the different forms of the invention the cushion spring shackle is formed with a bowed or U-shaped spring shackle element which is operatively interposed between the end of the usual vehicle spring B and the part to which the end of the said spring is customarily connected. The effective length of the vehicle spring is thus increased and greater resiliency is obtained in the mounting of the vehicle body. The U-shaped spring shackle element A is preferably formed of a series of superposed leaf elements which become successively shorter, in the usual manner, and are secured at their middle portion by a clip 1. The U-shaped spring shackle elements thus have their greatest strength at their middle portions, and the side portions of the springs increase in resiliency toward the free ends thereof. One of the free ends of each of the U-shaped members A is adapted to be connected to an end of the usual vehicle spring B, while the other end is connected to the part to which the said end of the vehicle spring is customarily connected, thereby interposing the spring shackle element A between the vehicle spring and the part to which the vehicle spring is usually connected, with the result that the spring shackle element A and vehicle spring B cooperate with each other to give increased resiliency to the spring mounting of the vehicle body.

Figure 1:
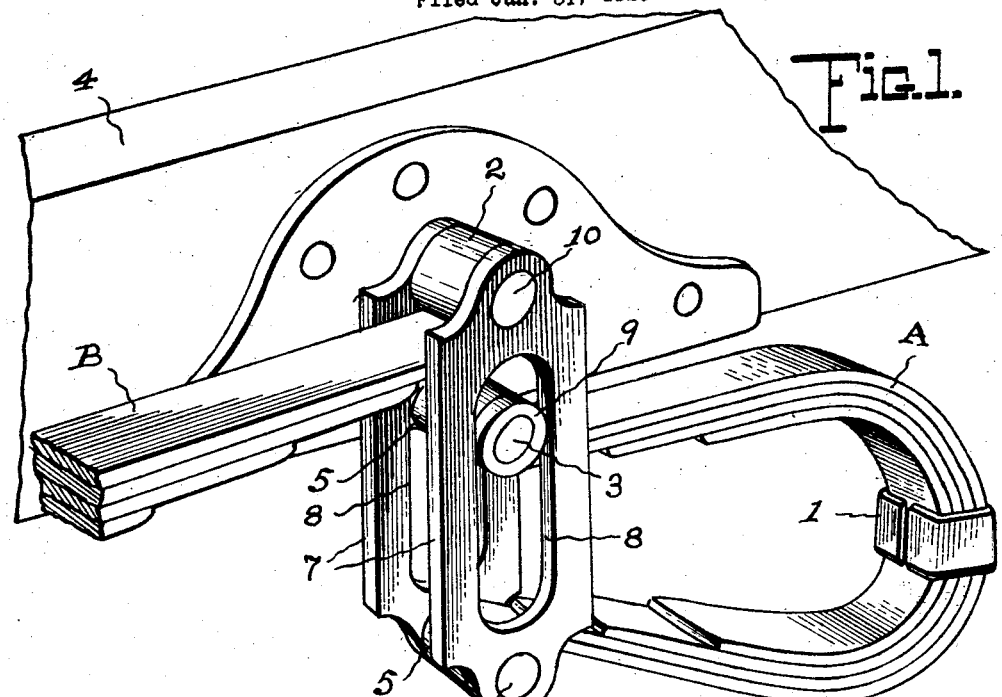

One of many possible embodiments of the invention is illustrated by Figure 1, in which the device is shown as applied to the rear spring B of a motor truck. The extremity of the vehicle spring B is returned or rolled to provide an eye 2 which ordinarily engages a pin 3 projecting from one side of the vehicle frame 4. The ends of the U-shaped spring shackle element A are returned or rolled to provide the attaching eyes 5. One of these eyes 5 engages the pin 3 of the vehicle body, while the other eye 5 engages a bolt 6 which connects the lower ends of a pair of spaced and parallel links 7. These links 7 normally assume a substantially upright position, and are formed with corresponding slots 8, which receive the pin 3 of the vehicle frame, said pin being in some instances provided with rollers 9 for engagement with the side walls of the slots to prevent friction between the parts as the springs are flexed and the two arms of the U-shaped spring shackle element A move toward and away from each other. The upper ends of the link 7 are connected by a bolt 10 which engages the eye 2 of the vehicle spring B.

With this construction it will be obvious that the U-shaped spring shackle element A is interposed between the vehicle spring B and the vehicle frame 4, so that the combined resiliency of the two spring members is utilized to support the vehicle frame. The two links 7 fit upon opposite sides of the vehicle spring and also upon opposite sides of the two ends of the U-shaped spring shackle element, with the result that the spring members are maintained in proper position at all times and held against relative lateral or sidewise displacement. End thrust on the vehicle spring is transmitted readily to the vehicle frame, and the provision of the link 7 with the slots 8 through which the pin 3 projects provides an effective guide means for directing the vibrations of the springs in an up and down direction and prevents the spring shackle element from being twisted so as to be subjected to torsional strains. There is no interference with the proper up and down flexing of the spring, although the springs are guided and directed in their movements so that relative lateral displacement of the spring members is prevented, and unnecessary lateral or torsional stresses on the spring members is avoided.

Figure 2:
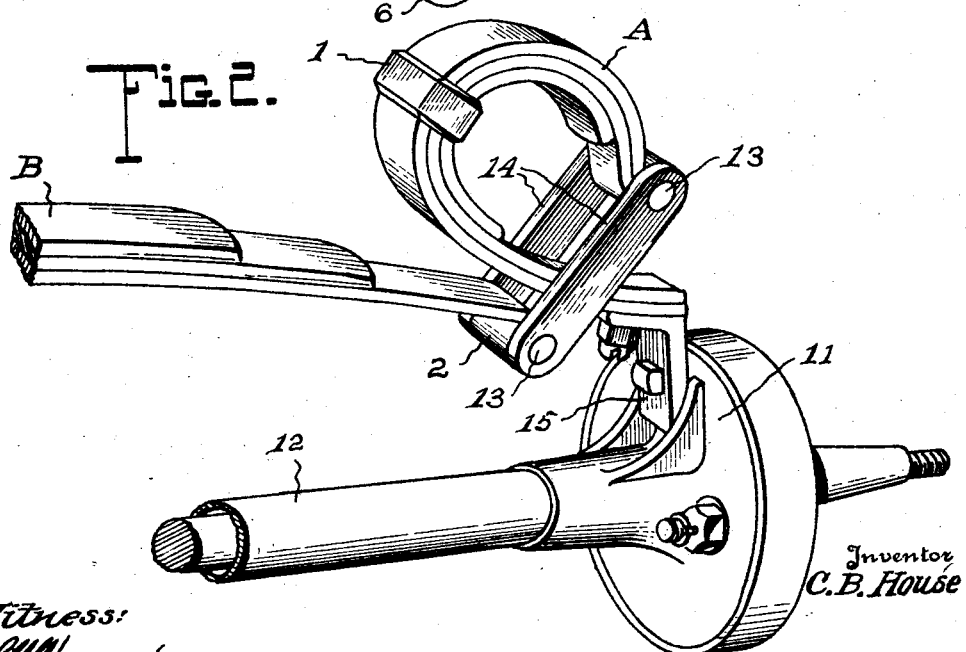
Figure 2 is a similar view, showing a slightly modified form of the spring shackle as applied to one end of a transversely extending rear spring of a motor vehicle.

A slight modification is shown by Figure 2 of the drawings, in which the spring shackle element A is shown as used in connection with the rear spring of a motor vehicle of that general type which is provided with transversely extending body supporting springs. Ordinarily in a vehicle of this kind the two extremities of the transversely extending vehicle spring B are connected by links to the upper ends of brackets which are rigidly secured to flange members 11 at the ends of the rear axle housing 12. The U-shaped spring shackle element A is provided at one end thereof with an attaching eye 5 which engages one of the bolts 13 connecting the corresponding ends of a pair of links 14. The links 14 fit upon opposite sides of the two arms of the U-shaped spring shackle element, and the other bolt 13 is engaged by the usual eye 2 at the end of the vehicle spring B. The other end of the U-shaped spring shackle element A is provided with a suitable L-shaped bracket 15, one arm of the bracket being secured to the spring, while the other arm of the bracket is secured to the flange 11 of the rear axle housing 12. In applying the device as an attachment this L-shaped bracket 15 is substituted for the usual bracket which is applied to the flange of the rear axle housing at this point. The spring shackle element A is thus interposed between the main vehicle spring and the rear axle housing, with the result that the combined resiliency of the two spring members is utilized in supporting the vehicle body. As in the previous instance, the links 14 fit upon opposite sides of the spring members and hold the spring members against relative lateral displacement. The main vehicle spring and the spring attachment both vibrate freely in substantially the same vertical plane, and the links 14 of the attachment serve to direct the U-shaped spring shackle element A in its vibratory action, thereby holding the spring members in proper relation to each other and preventing them from being subjected to unnecessary torsional strain.

Another modification is shown by Figure 3, in which the attachment is shown as used in connection with a semi-elliptic rear spring. The two free ends of the U-shaped spring shackle element A have bifurcated bearing members 16 applied to the outer faces thereof, so that they project laterally in opposite directions. When the spring element A is substantially horizontally disposed, one of the bearing members 16 projects upwardly, while the other bearing member 16 projects downwardly. The upper bearing member 16 is connected by a pin 17 to the extremity of the cantilever arm 18 of the vehicle frame, while the downwardly extending bearing member 16 is connected by a similar pin 17 to the usual eye at the end of the vehicle spring B. The spring shackle element is thus substituted for the usual link connection between the cantilever arm and vehicle spring. The resiliency of the spring shackle element A is thus utilized in supporting the vehicle body as well as the resiliency of the main vehicle spring B.

A still further modification is shown by Figure 4, in which the spring shackle element is shown as utilized in connection with a transversely extending front vehicle spring. The numeral 19 designates the front axle of the vehicle, and one end of the U-shaped spring shackle element A is engaged by a bolt 20 which passes through the usual opening provided in the front axle, and provides a means for rigidly securing the spring shackle element to the front axle. This bolt 20 is merely substituted for the usual bracket member to which the front vehicle spring is connected. The other end of the U-shaped spring shackle element A is provided with a bifurcated bearing member 16, such as those previously described, and this bearing member is connected by a pin 21 to the usual attachment eye at the end of the front vehicle spring B. The combined resiliency of the shackle spring and the front vehicle spring is thus utilized for the support of the vehicle body.

In all of the forms of the invention the effective length of the main vehicle springs is increased and a more effective spring action is obtained for absorbing the sudden shocks and jars and preventing their transmission to the vehicle body. There is less danger of breakage of the main vehicle springs and rebound is reduced to a minimum, since the wheels can roll over rough roads and obstructions with a minimum vibration of the car body. The increased resilience and easier riding qualities tends to prolong the life of the vehicle and also results in a saving in tires and fuel.

Certain modifications of the invention have been shown by the drawings and described for illustrative purposes, although it will be understood that the device can be made in different forms and sizes as may be required to fit any of the usual spring mountings in use. No changes are necessary in either the vehicle frame or the vehicle spring, the cushioning shackle device being merely substituted for the usual connecting means at the ends of the vehicle springs.

Having thus described my invention what I claim as new and desire to secure by Letters Patent is,

1. A vehicle spring shackle including a U-shaped spring element supported entirely at its end and with the bowed portion thereof free for vibratory movement, a pair of link members connected to one end of the spring element and provided with means for attachment to a vehicle spring, the other end of the U-shaped spring element projecting between the link elements, means thereon for slidably engaging the link elements to direct the spring element in its vibratory movements, and means for attaching the second mentioned end of the spring element to a support.

2. A vehicle spring shackle including a U-shaped spring element supported entirely at its ends and with the bowed portion thereof free for vibratory movement, a pair of links connected to one end of the U-shaped spring element and adapted to be attached to a vehicle spring, said links being slotted and the other end of the U-shaped spring element projecting between the links, and a pin for connecting the second mentioned end of the spring element to a support, said pin being received within the slots of the links and cooperating therewith to direct the spring element in its vibratory movements.

3. A vehicle spring shackle including a U-shaped spring element supported entirely at its ends and with the bowed portion thereof free for vibratory movement, a pair of links connected to one end of the spring element and provided with means for attachment to a vehicle spring, said links having corresponding slots formed therein and the other end of the U-shaped spring element projecting between the links, a pin connecting the second mentioned end of the spring element to a support and projecting into the slots, and anti-friction rollers on the pin for engagement with the slots to cooperate therewith to direct the spring in its vibratory movements.

4. A vehicle spring shackle including a U-shaped spring element supported entirely at its ends and with the bowed portion thereof free for vibratory movement, links for connecting one end of the U-shaped spring element to the vehicle spring, the other end of the spring element projecting between the links so as to be directed in its vibratory movements thereby, and means for attaching the second mentioned end of the spring element to a point of support.

In testimony whereof I affix my signature.

CHARLES B. HOUSE.